US012793964B2

(12) United States Patent
Choi et al.

(10) Patent No.: US 12,793,964 B2
(45) Date of Patent: Nov. 10, 2026

(54) POSITIVE ELECTRODE ACTIVE MATERIAL FOR LITHIUM SECONDARY BATTERY, PREPARATION METHOD THEREFOR, AND LITHIUM SECONDARY BATTERY COMPRISING SAME

(71) Applicant: ECOPRO BM CO., LTD., Cheongju-si (KR)

(72) Inventors: Moon Ho Choi, Cheongju-si (KR); Gyeong Jae Heo, Cheongju-si (KR); Seung Hyun Choi, Cheongju-si (KR); A Reum Yang, Cheongju-si (KR); Ju Kyoung Kang, Cheongju-si (KR)

(73) Assignee: ECOPRO BM CO., LTD., Cheongju-si (KR)

( * ) Notice: Subject to any disclaimer, the term of this patent is extended or adjusted under 35 U.S.C. 154(b) by 458 days.

(21) Appl. No.: 17/754,986

(22) PCT Filed: Oct. 19, 2020

(86) PCT No.: PCT/KR2020/014280
§ 371 (c)(1),
(2) Date: Apr. 18, 2022

(87) PCT Pub. No.: WO2021/075940
PCT Pub. Date: Apr. 22, 2021

(65) Prior Publication Data

US 2022/0411282 A1 Dec. 29, 2022

(30) Foreign Application Priority Data

Oct. 18, 2019 (KR) ........................ 10-2019-0130033
Jun. 26, 2020 (KR) ........................ 10-2020-0078294

(51) Int. Cl.
*H01M 4/131* (2010.01)
*H01M 10/0525* (2010.01)

(52) U.S. Cl.
CPC ....... *H01M 4/131* (2013.01); *H01M 10/0525* (2013.01); *C01P 2002/02* (2013.01); *C01P 2006/40* (2013.01)

(58) Field of Classification Search
CPC ......... H01M 2004/028; H01M 10/052; H01M 10/525; C01P 2004/84
See application file for complete search history.

(56) References Cited

U.S. PATENT DOCUMENTS

2004/0018429 A1 1/2004 Kweon et al.
2006/0188781 A1 8/2006 Thackeray et al.
(Continued)

FOREIGN PATENT DOCUMENTS

CN 102056844 A 5/2011
CN 104507865 A 4/2015
(Continued)

OTHER PUBLICATIONS

Ding et al., "Stable heteroepitaxial interface of Li-rich layered oxide cathodes with enhanced lithium storage", doi:10.1016/j.ensm.2018.12.004 (Year: 2018).*
(Continued)

*Primary Examiner* — Rebecca L Grusby
(74) *Attorney, Agent, or Firm* — SALIWANCHIK, LLOYD & EISENSCHENK

(57) ABSTRACT

The present invention relates to a positive electrode active material comprising an overlithiated layered oxide (OLO) and, more specifically, to a positive electrode active material comprising: an OLO represented by chemical formula 1 below; and an amorphous free oxide coating layer of an amorphous free oxide on the surface of the OLO represented by chemical formula 1. [Chemical formula 1] $Li_2MnO_3 \cdot (1-r)Li_aNi_xCo_yMn_zM1_{1-(x+y+z)}O_2$ (wherein, in chemical formula 1, $0<r\leq0.6$, $0<a\leq1$, $0\leq x\leq1$, $0\leq y<1$, $0\leq z<1$, and $0<x+$ (Continued)

y+z≤1, and M1 is at least any one selected from Na, K, Mg, Al, Fe, Cr, Y, Sn, Ti, B, P, Zr, Ru, Nb, W, Ba, Sr, La, Ga, Mg, Gd, Sm, Ca, Ce, Fe, Al, Ta, Mo, Sc, V, Zn, Cu, In, S, B, Ge, Si, and Bi).

16 Claims, 10 Drawing Sheets

(56) References Cited

U.S. PATENT DOCUMENTS

2010/0308278 A1 12/2010 Kepler et al.
2011/0052981 A1 3/2011 Lopez et al.
2012/0064411 A1 3/2012 Lee et al.
2014/0045067 A1 2/2014 Cho et al.
2014/0087263 A1* 3/2014 Matsumoto ............ C01D 15/02 429/223
2014/0106222 A1 4/2014 Park et al.
2014/0131616 A1 5/2014 Sun et al.
2014/0141331 A1 5/2014 Lee et al.
2014/0162126 A1 6/2014 Cho et al.
2014/0162127 A1 6/2014 Kim et al.
2014/0242468 A1 8/2014 Song et al.
2015/0030928 A1* 1/2015 Kwak ................... H01M 4/505 264/618
2015/0325846 A1 11/2015 Kitagawa et al.
2016/0181605 A1 6/2016 Li et al.
2016/0190555 A1 6/2016 Kapylou et al.
2016/0254539 A1 9/2016 Kagei et al.
2017/0012284 A1 1/2017 Bugga et al.
2017/0133676 A1 5/2017 Kodato et al.
2018/0323435 A1 11/2018 Lim et al.
2019/0074512 A1 3/2019 Choi et al.
2019/0341609 A1 11/2019 Endo et al.
2020/0161650 A1* 5/2020 Park ....................... C01G 53/50
2020/0303720 A1 9/2020 Jo et al.
2020/0313157 A1 10/2020 Johnson et al.
2021/0119208 A1 4/2021 Choi et al.
2021/0226205 A1* 7/2021 Park ...................... H01M 4/525
2022/0388864 A1 12/2022 Choi et al.
2022/0393153 A1 12/2022 Choi et al.

FOREIGN PATENT DOCUMENTS

CN 104617304 A 5/2015
CN 104979554 A 10/2015
CN 105470493 A 4/2016
CN 105612124 A 5/2016
CN 106797049 A 5/2017
CN 108172773 A 6/2018
CN 108269972 A 7/2018
CN 108886144 A 11/2018
EP 2763220 A2 8/2014
EP 3819262 A1 5/2021
JP 1998069910 A 3/1998
JP 2005251716 A 9/2005
JP 2006-012426 A 1/2006
JP 2011070789 A 4/2011
JP 2011171113 A 9/2011
JP 2012138352 A 7/2012
JP 2012-204311 A 10/2012
JP 2012190772 A 10/2012
JP 2014041720 A 3/2014
JP 2014513392 A 5/2014
JP 2014222607 A 11/2014
JP 2015122235 A 7/2015
JP 2015130273 A * 7/2015
JP 2016139569 A 8/2016
JP 2017-10842 A 1/2017
JP 2017010841 A 1/2017
JP 2018508929 A 3/2018
JP 6315404 B2 4/2018
JP 2019091692 A 6/2019
KR 20120089845 A 8/2012
KR 10-2013-0001703 A 1/2013
KR 10-2013-0058590 A 6/2013
KR 20130117338 A 10/2013
KR 20140025102 A * 3/2014
KR 20140048456 A 4/2014
KR 20150014884 A 2/2015
KR 101520634 B1 5/2015
KR 10-2015-0145736 A 12/2015
KR 20160032246 A 3/2016
KR 20160039983 A 4/2016
KR 20160044698 A 4/2016
KR 20160123406 A 10/2016
KR 10-2017-0063387 A 6/2017
KR 10-2017-0080104 7/2017
KR 10-2019-0008156 1/2019
KR 20190046617 A 5/2019
KR 20190110551 A 9/2019
WO 2011031546 A2 3/2011
WO 2013002457 A1 1/2013
WO 2015053357 A1 4/2015
WO 2016053056 A1 4/2016
WO 2017051338 A1 3/2017
WO 2018038037 A1 3/2018
WO 2018043669 A1 3/2018
WO 2018137942 A1 8/2018

OTHER PUBLICATIONS

Machine translation of KR 2016-0123406 via EPO (Year: 2016).*

Machine translation of KR 2014-0025102 via EPO (Year: 2014).*

Machine translation of JP 2015-130273 via EPO (Year: 2015).*

Office Action dated Nov. 15, 2023 in Korean Application No. 10-2023-0044072.

Office Action dated Jan. 6, 2024 in Korean Application No. 10-2023-0093098.

Office Action dated Jan. 6, 2024 in Korean Application No. 10-2023-0128987.

Extended European Search Report dated Nov. 17, 2023 in European Application No. 20877964.5.

Seu, C.S. et al., “Aluminum Borate Coating on High-Voltage Cathodes for Li-Ion Batteries,” Journal of the Electrochemical Society, 2015, 162(12):A2259-A2265.

Makhonina, E.V. et al., “Li-rich and Ni-rich transition metal oxides: Coating and core-shell structures,” Applied Surface Science, 2019, 474:25-33.

Qiao, Q.Q. et al., “Surface modification of Li-rich layered Li(Li0.17Ni0.25Mn0.58) O2 oxide with Li—Mn—PO4 as the cathode for lithium-ion batteries,” Journal of Materials Chemistry A, 2013, 1:5262-5268.

International Search Report, dated Feb. 3, 2021, received in PCT Application No. PCT/KR2020/014280.

Ding, Z. et al. “Stable heteroepitaxial interface of Li-rich layered oxide cathodes with enhanced lithium storage” Energy Storage Materials, 2019 (Epub Dec. 5, 2018), 21:69-76.

Zhao, Y. et al. “Surface Structural Transition Induced by Gradient Polyanion-Doping in Li-Rich Layered Oxides: Implications for Enhanced Electrochemical Performance” Advanced Functional Materials, 2016, 26:4760-4767.

Office Action dated May 23, 2023 in Japanese Application No. 2022-523072.

Office Action dated Jul. 28, 2023 in Chinese Application No. 202080073047.4.

Extended European Search Report dated Nov. 17, 2023 in European Application No. 20877965.2.

Extended European Search Report dated Nov. 23, 2023 in European Application No. 20876679.0.

International Search Report dated Mar. 15, 2021 in International Application No. PCT/KR2020/014281.

International Search Report dated Mar. 8, 2021 in International Application No. PCT/KR2020/014282.

Office Action dated Apr. 2, 2024 in Japanese Application No. 2022-130624.

Office Action dated Feb. 14, 2022 in Korean Application No. 10-2020-0078294.

(56) References Cited

OTHER PUBLICATIONS

Office Action dated Jan. 17, 2024 in Chinese Application No. 202080072959.X.
Office Action dated Jun. 6, 2023 in Chinese Application No. 202080072966.X.
Office Action dated Mar. 1, 2024 in Chinese Application No. 202080073047.4.
Office Action dated Mar. 12, 2024 in Chinese Application No. 202011109592.2.
Office Action dated May 2, 2023 in Japanese Application No. 2022-523166.
Office Action dated May 23, 2023 in Japanese Application No. 2022-523167.
Office Action dated Nov. 23, 2021 in Korean Application No. 10-2020-0051074.
Office Action dated Oct. 12, 2022 in Korean Application No. 10-2020-0135029.
Office Action dated Oct. 5, 2021 in Japanese Application No. 2020-174737.
Office Action dated Sep. 19, 2023 in Chinese Application No. 202011109592.2.
Office Action dated Sep. 24, 2022 in Korean Application No. 10-2020-0134483.
Office Action dated Aug. 11, 2022 in U.S. Appl. No. 17/072,721.
Office Action dated Jun. 14, 2023 in U.S. Appl. No. 17/072,721.
Third Party Observation dated Nov. 8, 2023 in European Application No. 20202300.8.
Third Party Observation dated Sep. 19, 2023 in European Application No. 20202300.8.
Ding, W. "Synthesis and modification of high voltage ternary cathode materials for lithium-ion batteries" Metallurgical Industry Press, Mar. 2019, p. 12.
Ding, Z. et al. "Stable heteroepitaxial interface of Li-rich layered oxide cathodes with enhanced lithium storage" Energy Storage Materials. 2019, vol. 21, pp. 69-76.
Kong, J-Z. et al. "Li-ion-conductive Li2TiO3-coated Li[Li0.2Mn0.51Ni0.19Co0.I]O2 for high-performance cathode material in lithium-ion battery", J Solid State Electrochem, 2016, vol. 20, No. 5, pp. 1435-1443.
Li, X. et al. "Effect of niobium doping on the microstructure and electrochemical properties of lithium-rich layered Li [Li0.2Ni0.2Mn0.6]O2 as cathode materials for lithium ion batteries" RSC Adv., 2015, 5:45351-45358.
Ma, J. et al. "A highly homogeneous nanocoating strategy for Li-rich Mn-based layered oxides based on chemical conversion", Journal of Power Sources, EPUB Dec. 2, 2014, vol. 277, pp. 393-402.
Wu, F. et al. "Can surface modification be more effective to enhance the electrochemical performance of lithium rich materials?" Journal of Materials Chemistry, 2012, 22: 1489-1497.
Wu, Y. et al. "Simultaneous surface coating and chemical activation of the Li-rich solid solution lithium rechargeable cathode and its improved performance", Electrochimica Acta, 2013, vol. 113, pp. 54-62.
Xie, Y. et al. "Improving the rate capability and decelerating the voltage decay of Li-rich layered oxide cathodes by constructing a surface-modified microrod structure," Journal of Alloys and Compounds, 2019, 772:230-239.
Zhang, J. et al. "New insights into the modification mechanism of Li-rich Li1.2Mn0.6Ni0.2O2 coated by Li2ZrO3", Physical Chemistry Chemical Physics, 2016, vol. 18, No. 19, pp. 13322-13331.
Zhao, E. et al. "Facile synthesis and enhanced electrochemical performances of Li2TiO3-coated lithium-rich layered Li1.13Ni0.30Mn0.57O2 cathode materials for lithium-ion batteries", Journal of Power Sources, 2015, vol. 294, pp. 141-149.
Zhao, J. et al. "Tailorable electrochemical performance of spinel cathode materials via in-situ integrating a layered Li2MnO3 phase for lithium-ion batteries," Journal of Power Sources, 2016, 333:43-52.
Office Action dated Oct. 15, 2024 in Japanese Application No. 2023-201270.
Longo, R.C. et al. "Core-Shell Nanocomposites for Improving the Structural Stability of Li-Rich Layered Oxide Cathode Materials for Li-Ion Batteries" ACS Appl. Mater. Interfaces, 2018, 10:19226-19234.
Office Action dated Feb. 25, 2025 in Japanese Application No. JP 2023-215143 (with English translation).
Office Action dated Sep. 2, 2025 in Japanese Application No. 2024-107739 (with English translation).
Office Action dated Oct. 24, 2025 in U.S. Appl. No. 17/754,989.
Office Action dated Jul. 28, 2026 in Japanese Application No. 2025-235906.

* cited by examiner

POSITIVE ELECTRODE ACTIVE MATERIAL FOR LITHIUM SECONDARY BATTERY, PREPARATION METHOD THEREFOR, AND LITHIUM SECONDARY BATTERY COMPRISING SAME

TECHNICAL FIELD

The present invention relates to a cathode active material containing overlithiated layered oxide (OLO), and more particularly to a cathode active material for a lithium secondary battery having an amorphous glassy oxide coating layer formed on the surface thereof, a method for preparing the same, and a lithium secondary battery containing the same.

BACKGROUND ART

The development of portable mobile electronic devices, such as mobile phones, MP3 players, and tablet PCs, has brought about an explosive increase in the demand for secondary batteries capable of storing electrical energy. In particular, with the advent of electric vehicles, medium- and large-sized energy storage systems, and portable devices requiring high energy density, the demand for lithium secondary batteries has increased.

A cathode active material that has recently been in the spotlight is lithium nickel manganese cobalt oxide $Li(Ni_xCo_yMn_z)O_2$ (wherein x, y, and z are each independently atomic fractions of oxide-constituting elements, and satisfy $0<x\leq 1$, $0<y\leq 1$, $0<z\leq 1$, and $0<x+y+z\leq 1$). This cathode active material has an advantage of achieving high capacity because it is used at a higher voltage than $LiCoO_2$, which has been actively researched and used as a cathode active material, and has another advantage of being inexpensive due to the relatively low Co content thereof. However, this material has disadvantages of unsatisfactory rate capability and poor lifetime characteristics at high temperatures.

Accordingly, research has been conducted to apply overlithiated layered oxide (OLO), which exhibits a higher reversible capacity than conventional $Li(Ni_xCo_yMn_z)O_2$, to a lithium secondary battery.

However, such overlithiated layered oxide (OLO) has a problem in that voltage decay occurs during lifetime cycling, which is due to phase transition from a spinel-like structure to a cubic structure due to transition metal migration during lifetime cycling. The voltage decay of the overlithiated layered oxide (OLO) is an issue that must be solved in order to realize practical application thereof to a lithium secondary battery.

In addition, there is a need for a solution capable of improving the electrochemical properties of overlithiated layered oxide (OLO).

DISCLOSURE

Technical Problem

It is one object of the present invention to improve the lithium ion conductivity of a cathode active material containing overlithiated layered oxide and reduce the resistance thereof, thereby reducing overvoltage during charging and discharging and improving high-rate characteristics.

It is another object of the present invention to suppress the elution of Mn from an Mn-rich cathode active material and the lattice change from a spinel phase to a rock-salt phase that begins from the surface during cycling, and to thereby suppress voltage decay and improve the lifetime thereof.

Technical Solution

In accordance with one aspect of the present invention, the above and other objects can be accomplished by the provision of a cathode active material containing an overlithiated layered oxide (OLO) represented by the following Formula (1):

$$rLi_2MnO_3\cdot(1-r)Li_aNi_xCo_yMn_zM1_{1-(x+y+z)}O_2 \quad \text{[Formula 1]}$$

(wherein r, a, x, y, and z satisfy $0<r\leq 0.6$, $0<a\leq 1$, $0\leq x\leq 1$, $0\leq y<1$, $0\leq z<1$, and $0<x+y+z\leq 1$, and M1 includes at least one selected from Na, K, Mg, Al, Fe, Cr, Y, Sn, Ti, B, P, Zr, Ru, Nb, W, Ba, Sr, La, Ga, Mg, Gd, Sm, Ca, Ce, Fe, Al, Ta, Mo, Sc, V, Zn, Cu, In, S, B, Ge, Si, and Bi).

The overlithiated layered oxide may be a solid solution phase in which $Li_2MnO_3$ having a monoclinic structure is mixed with $LiMO_2$ having a rhombohedral structure, wherein M may include at least one selected from Ni, Co, Mn, and M1.

In addition, in the overlithiated layered oxide, a plateau attributable to $Li_2MnO_3$ may appear at 4.4 V in the initial charge/discharge profile. In the overlithiated layered oxide according to an embodiment of the present invention, during initial charging, the $Li_2MnO_3$ phase is electrochemically inactive up to 4.4V, unlike lithium, and lithium deintercalation from the $Li_2MnO_3$ phase and oxygen evolution occur at 4.4 V or higher.

The ratio (Li/Ni+Co+Mn) of the number of moles of lithium to the total number of moles of all metals contained among Ni, Co, or Mn in the overlithiated layered oxide represented by Formula 1 may be 1.1 to 1.6, 1.2 to 1.6, 1.3 to 1.6, or 1.4 to 1.5.

In Formula 1, x may be more than 0 and not more than 0.5, more than 0 and not more than 0.4, more than 0 and not more than 0.3, more than 0 and not more than 0.2, or more than 0 and not more than 0.1.

In Formula 1, y may be more than 0 and not more than 0.5, more than 0 and not more 0.4, more than 0 and not more than 0.3, more than 0 and not more than 0.2, or 0.1 to 0.2.

In Formula 1, M1 includes at least one selected from Na, K, Mg, Al, Fe, Cr, Y, Sn, Ti, B, P, Zr, Ru, Nb, W, Ba, Sr, La, Ga, Mg, Gd, Sm, Ca, Ce, Fe, Al, Ta, Mo, Sc, V, Zn, Nb, Cu, In, S, B, Ge, Si and Bi, and is for example a dopant that may be contained in the overlithiated layered oxide. More preferably, M1 may include at least one selected from Ba, Sr, B, P, Y, Zr, Nb, Mo, Ta, and W, which further grow primary particles to more suitably adjust the size thereof to a predetermined range, most preferably at least one selected from Nb and Ta.

In addition, the ratio (Mn/Ni) of the number of moles of Mn to the total number of moles of Ni may be 1 to 4.5, 1 to 4, 2 to 4.5, 2 to 4, 3 to 4.5, or 3 to 4.

The oxide of the present invention may have a layered structure in which a lithium atomic layer alternately overlaps a metal atomic layer of Ni, Co, Mn, or M1 via an oxygen atomic layer interposed therebetween.

The plane forming the layer in the layered structure of the cathode active material may have a crystal orientation in a direction perpendicular to the C axis. In this case, the mobility of lithium ions contained in the cathode active material is improved, the structural stability of the cathode active material is improved, and thus initial capacity characteristics, output characteristics, resistance characteristics, and long-term lifetime characteristics are improved upon application to the battery.

The cathode active material according to the present invention is an oxide containing large amounts of lithium and manganese, is capable of inhibiting Mn elution by forming an amorphous glassy oxide coating layer on the surface thereof, and is capable of inhibiting voltage decay and improving lifetime by suppressing a lattice change to a rock-salt phase from a spinel phase starting from the surface during cycling.

In addition, in the present invention, the amorphous glassy oxide coating layer is coated on the surface of overlithiated layered oxide particles, thereby solving the problem of non-uniform coating in a crystalline state and further improving the movement of lithium ions.

In addition, in the present invention, the amorphous glassy oxide coating layer is coated on the surface of the overlithiated layered oxide particles, thereby reducing the overvoltage generated in the overlithiated layered oxide during charging and discharging and improving high rate characteristics.

The amorphous glassy oxide coating layer may contain at least one element selected from Si, B, P, and Ge.

In addition, the amorphous glassy oxide coating layer may contain a material represented by Formula 2 below:

$$xLi_2O*(1-x)M2_aO_b \quad \text{[Formula 2]}$$

In Formula 2, x may satisfy $0<x\leq8$, more preferably $0.13\leq x\leq8$. In addition, in Formula 2, a may satisfy $0<a\leq2$, more preferably $1\leq a\leq2$. In addition, in Formula 2, b may satisfy $0<b\leq5$, more preferably $2\leq b\leq5$. In addition, M2 may include at least one selected from Si, B, P, and Ge.

The amorphous glassy oxide coating layer may be present in an amount of 0.05 to 5 mol %, 0.1 to 3 mol %, or 0.1 to 2 mol % of the overlithiated layered oxide.

The amorphous glassy oxide coating layer may be uniformly or non-uniformly present on the surface of the overlithiated layered oxide represented by Formula 1 above.

In a more preferred embodiment, in the present invention, by coating the surface of the overlithiated layered oxide with amorphous glassy oxide, spreadability can be improved, so uniform coating can be obtained compared to the case where the surface is coated with another oxide.

Also, for example, the amorphous glassy oxide coating layer may be formed on the surface of each of secondary particles or primary particles.

Also, for example, an element contained in the amorphous glassy oxide coating layer on the surface of secondary particles or primary particles may form a concentration gradient.

In the cathode active material according to an embodiment of the present invention, the thickness of the amorphous glassy oxide coating layer may be 1 to 100 nm, more preferably 10 to 100 nm. When the amorphous glassy oxide coating layer has a thickness smaller than the lower limit, the improvement may be insufficient, and when the coating layer has a thickness greater than the upper limit, resistance to lithium ions may increase. When the amorphous glassy oxide coating layer falls within the range defined above, the elution of Mn from the Mn-rich cathode active material of the present invention is suppressed and the lattice change from the spinel phase to the rock-salt phase starting from the surface during cycling is suppressed, so voltage decay can be suppressed and lifetime can be improved.

In the cathode active material according to an embodiment of the present invention, primary particles aggregate to form secondary particles, and the ratio of primary particles having a size of 300 nm to 10 μm to the total volume of primary particles included in the secondary particles may be adjusted to 50 to 100% by volume, 70 to 100% by volume, or 100% by volume.

In another embodiment, in the cathode active material, the ratio of primary particles having a size greater than 500 nm to not greater 10 μm to the total volume of primary particles constituting the secondary particles may be adjusted to 50 to 100% by volume, 70 to 100% by volume, or 100% by volume.

In another embodiment, in the cathode active material, the ratio of primary particles having a size of 1 μm to 10 μm to the total amount of overlithiated layered oxide may be adjusted to 50 to 100% by volume, 70 to 100% by volume, or 100% by volume.

In another embodiment, in the cathode active material, the ratio of primary particles having a size greater than 1 μm to the total amount of overlithiated layered oxide may be adjusted to 50 to 100% by volume, 70 to 100% by volume, or 100% by volume.

In another embodiment, in the cathode active material, the ratio of primary particles having a size of 2 μm or more to the total amount of overlithiated layered oxide is adjusted to 50 to 100% by volume or 50 to 70% by volume.

In another embodiment, in the cathode active material, the size of the primary particles is adjusted, so the number of primary particles present in the secondary particles is adjusted to 1 to 1,000, 1 to 100, 1 to 10, or 1.

The size of the primary particles means the maximum length of the particles.

In addition, as an example, the average particle diameter of the primary particles of the cathode active material may be adjusted to greater than 500 nm to not greater 10 μm, or 1 μm to 10 μm.

The overlithiated layered oxide of the present invention has a problem in that voltage decay occurs during the lifetime thereof, which is due to a phase transition from a spinel-like structure to a cubic structure due to movement of transition metals during lifetime cycling. In the present invention, the size of the primary particles can be adjusted in order to solve this problem and increase the density of the cathode active material.

However, the lithium ion diffusion distance increases when the size of primary particles increases, so there is a problem in that overpotential is generated due to concentration polarization of lithium ions during charging and discharging. As a result, kinetics may be lowered and thus the capacity of the cathode active material may be reduced. However, by forming the amorphous glassy oxide coating layer, it is possible to increase ionic conductivity and enhance the kinetics of lithium ions, thereby increasing the capacity and decreasing the overvoltage.

The average particle diameter of the secondary particles of the cathode active material according to an embodiment of the present invention may be 2 to 20 μm, more preferably 10 to 20 μm, and more preferably 14 to 16 μm. The average particle size may be defined as a particle size corresponding to 50% of the cumulative volume in a particle size distribution curve of the particles. The average particle diameter may be measured using, for example, a laser diffraction method.

In the cathode active material according to an embodiment of the present invention, the size of the primary particles in the cathode active material stage is increased compared to the size of the primary particles in the precursor stage under the preparation process conditions according to the following Examples. In addition, in the preparation process conditions according to the following Examples, the ratio (size of primary particles of cathode active material added with dopant acting as flux)/(size of primary particles of cathode active material without dopant acting as flux) is 1 or more, more preferably 30 or more, and most preferably 50 or more.

In Formula 1, M1 is a dopant that acts as a flux for growing the primary particles, and may be doped into a lattice structure. In an embodiment, by adding a flux dopant during calcination with a lithium compound, followed by mixing and heat-treatment, the size of the primary particles can be increased to a desired level. The term "acting as a flux" means that a substance can act as a dopant that increases the size of the primary particles through growth of the primary particles.

In the cathode active material according to the present invention, as the number of parts corresponding to the single crystal structure increases, that is, as the number of primary particles decreases, the problem of voltage decay in polycrystals can be further solved.

In XRD analysis of the cathode active material according to an embodiment of the present invention, the full width at half maximum (FWHM(deg.)) at I (104) may be 0.1 to 0.25 (deg.), but may vary depending on the manganese content. Accordingly, by controlling the decrease rate of the full width at half maximum through addition and control of content of the dopant M1, the problems related to lifetime and voltage decay can be solved.

In the present invention, the full width at half maximum (FWHM(deg.)) in I(104) in XRD analysis upon calcination under the same conditions can be decreased to 5 to 50%, 5 to 40%, 5 to 30%, 5 to 20%, 10 to 25%, or 10 to 20% when M1 is contained, compared to Comparative Example in which M1 is not contained, by increasing the size of primary particles in the overlithiated layered oxide.

The cathode active material according to an embodiment of the present invention may contain a material represented by the following Formula 3. The material represented by the following Formula 3 may be a material produced by reaction between lithium and a dopant acting as a flux that induces the growth of primary particles.

$$Li_aM3O_b \quad \text{[Formula 3]}$$

(wherein a, and b satisfy $0<a\leq 8$ and $0<b\leq 15$, and M3 includes at least one selected from Na, K, Mg, Al, Fe, Cr, Y, Sn, Ti, B, P, Zr, Ru, Nb, W, Ba, Sr, La, Ga, Mg, Gd, Sm, Ca, Ce, Fe, Al, Ta, Mo, Sc, V, Zn, Cu, In, S, B, Ge, Si and Bi.)

M1 of Formula 1 may be present in an amount of 0.001 to 10 mol %, 0.01 to 5 mol %, 0.01 to 3 mol %, 0.1 to 2 mol %, or 0.1 to 1 mol % based on the total number of moles of metals included in the cathode active material. When the content of dopant M1 as a flux inducing the growth of primary particles exceeds the above range, lithium composite oxide may be produced in excess, which may decrease capacity and efficiency, and when the content is less than the above range, the effect of growing primary particles may be insufficient.

In addition, the energy density per unit volume (Wh/L) of the cathode active material according to an embodiment of the present invention may be 2.7 to 4.0 (Wh/L).

In addition, the energy density per unit volume (Wh/L) of the cathode active material according to the embodiment of the present invention may be increased by 5 to 30% compared to a material not containing M1. The cathode active material according to the present invention is controlled to increase the size of primary particles in the overlithiated layered oxide, so the energy density per unit volume (Wh/L) is 5 to 25%, 5 to 20%, 10 to 25%, or 10 to 20% when M1 is contained, compared to Comparative Example in which M1 is not contained.

In addition, the filling density (g/cc) of the cathode active material adjusted through addition of the dopant M1 and control of content thereof may be 2.0 to 4.0 (g/cc).

In addition, the specific surface area (BET, $m^2/g$) of the cathode active material, adjusted through addition of the dopant M1 and control of content thereof, may be 0.1 to 1.5 (BET, $m^2/g$).

In the cathode active material according to the present invention, by controlling the size of primary particles in the overlithiated layered oxide, the specific surface area (BET, $m^2/g$) can be decreased to 20 to 80% when M1 is contained compared to Comparative Example, in which M1 is not contained.

The present invention causes the growth of primary particles to control the portion corresponding to the single crystal structure of the cathode active material, thereby increasing the energy density per unit volume, decreasing the specific surface area, reducing the surface area of the cathode active material, and solving problems related to lifetime and voltage decay. In the present invention, the expression "causing the growth of primary particles" includes all concepts of nucleation, Ostwald ripening, and particle aggregation.

The method for preparing a cathode active material according to an embodiment of the present invention includes a first step of preparing a cathode active material precursor.

Preparation of the precursor may be performed using co-precipitation, spray-drying, solid-phase reaction, wet grinding, fluidized bed drying, or vibration drying, but is not particularly limited thereto.

Then, the method further includes a second step of mixing the cathode active material precursor with a lithium compound and calcining the resulting mixture to form a lithium composite oxide.

In the second step, a compound containing M1 of Formula 1 may be further mixed and calcined.

The temperature of the calcination may be 750 to 950° C., 800 to 950° C., or 850 to 950° C.

Then, the method includes a third step of mixing the material formed in the second step with a coating precursor to form an amorphous glassy oxide coating layer.

In the present invention, the amorphous glassy oxide coating layer may be uniformly applied onto the surface of the overlithiated layered oxide through the following process.

In the third step, the coating precursor may be performed through a dry mixing process.

In addition, the coating precursor may be mixed by a wet mixing process in the third step, and may be dispersed or dissolved in water, alcohol, or a dispersion solution before mixing with the material formed in the second step.

The third step may further include, after mixing the material formed in the second step with the coating precursor, allowing the mixture to stand at 250 to 700° C. for 7 to 12 hours and then subjecting the mixture to furnace cooling. The temperature may vary depending on the type of the coating precursor. For example, when forming a coating layer containing B, the temperature may be 250 to 500° C. or 250 to 400° C., and when forming a coating layer containing P, the temperature may be 500 to 700° C. or 550 to 650° C.

When the coating precursor contains B or P in the method for preparing a cathode active material according to an embodiment of the present invention, it may include at least one selected from $B_2O_3$, $P_2O_5$, $H_3BO_3$, $NH_4HPO_4$, $NH_4H_2PO_4$, $(NH_4)_2HPO_4$, and $H_3PO_4$. In addition, more preferably, the coating precursor may be $H_3BO_3$ or $NH_4HPO_4$, but is not particularly limited thereto, so long as it is capable of forming an amorphous glassy oxide coating layer.

The method of preparing a cathode active material according to an embodiment of the present invention may further include, after the first step and before the second step, roasting the prepared precursor at 300 to 600° C.

The method for preparing a cathode active material according to an embodiment of the present invention may further include, after the first step and before the second step, washing the calcined material with water, followed by drying.

The method for preparing a cathode active material according to an embodiment of the present invention, may further include, after the second step and before the third step, washing the calcined material with water, followed by drying.

A secondary battery according to an embodiment of the present invention includes the cathode active material.

The cathode active material is the same as described above, and the binder, conductive material, and solvent are not particularly limited, as long as they can be used for a cathode current collector of a secondary battery.

The lithium secondary battery may specifically include a cathode, an anode facing the cathode, and an electrolyte between the cathode and the anode, but is not limited to this configuration, as long as it can be used as a secondary battery.

Advantageous Effects

The present invention is capable of improving lithium ion conductivity in the overlithiated layered oxide, reducing resistance, reducing overvoltage generated during charging and discharging, and improving high-rate characteristics.

In addition, the present invention is capable of suppressing the elution of Mn from the Mn-rich cathode active material and suppressing the lattice change from the spinel phase to the rock-salt phase starting from the surface during cycling, thereby suppressing voltage decay and prolonging the lifetime thereof.

BEST MODE

Figure 1:
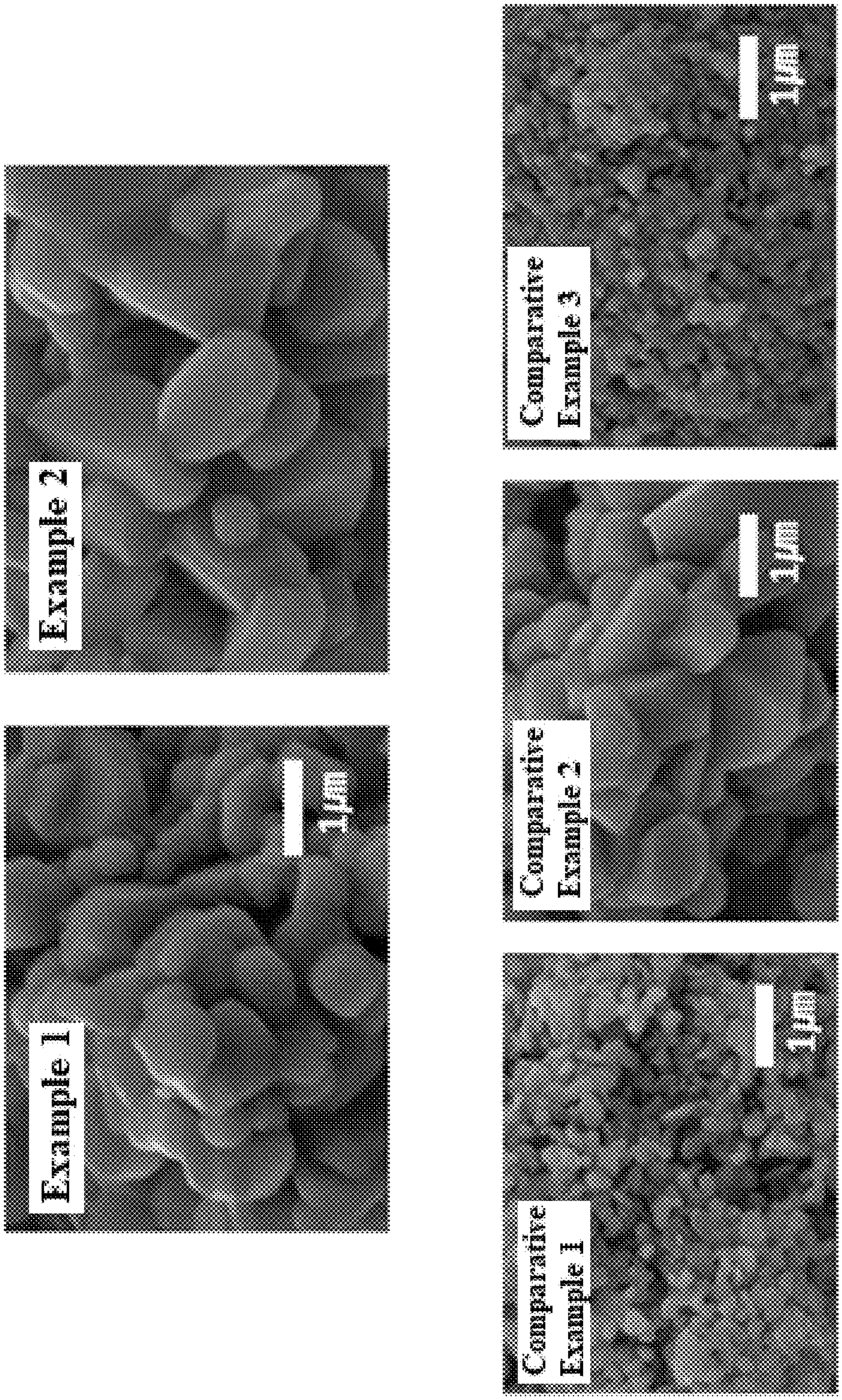
FIG. 1 shows the results of SEM performed on cathode active materials according to Examples and Comparative Examples of the present invention.

Hereinafter, the present invention will be described in more detail with reference to Examples. However, these examples should not be construed as limiting the present invention.

As used herein, terms such as "comprising" should be understood as open-ended terms that do not preclude the inclusion of other elements.

As used herein, the terms "preferred" and "preferably" refer to embodiments of the present invention that may provide certain advantages in specific environments, and are not intended to exclude other embodiments from the scope of the invention.

<Example 1> Preparation of Cathode Active Material

Synthesis

A spherical $Ni_{0.2}Co_{0.1}Mn_{0.7}CO_3$ precursor was synthesized using a co-precipitation method. 25 wt % of $NaCO_3$ and 28 wt % of $NH_4OH$ were added to a 2.5M composite transition metal sulfate solution prepared by mixing $NiSO_4.6H_2O$, $CoSO_4.7H_2O$, and $MnSO_4H_2O$ at a molar ratio of 20:10:70 in a 90 L reactor. At this time, the pH in the reactor was maintained at 8.0 to 11.0, and the temperature thereof was maintained at 45 to 50° C. In addition, $N_2$, which is an inert gas, was injected into the reactor to prevent oxidation of the prepared precursor.

After completion of synthesis, washing and dehydration were performed using a filter press (F/P). Finally, the dehydrated product was dried at 120° C. for 2 days and filtered through a 75 μm (200 mesh) sieve to obtain a $Ni_{0.17}Co_{0.106}Mn_{0.719}CO_3$ precursor having a size of 4 μm to 20 μm.

Roasting

The prepared precursor was maintained in an $O_2$ or air (50 L/min) atmosphere in a box furnace, and the temperature was elevated at a rate of 2° C./min and maintained at 550° C. for 1 to 6 hours, followed by furnace cooling.

Calcination

LiOH or $Li_2CO_3$ was weighed such that the roasted precursor had a Li/(Ni+Co+Mn) ratio of 1.45, and 0.6 mol % of $Nb_2O_5$ was weighed as a flux dopant, followed by mixing using a manual mixer (MM).

The mixture was maintained under an $O_2$ or air (50 L/min) atmosphere in a box furnace, heated at 2° C./min, and maintained at a calcination temperature of 900° C. for 7 to 12 hours, followed by furnace cooling to prepare a cathode active material.

The composition of the cathode active material prepared in Example 1 was Li:Ni:Co:Mn:Nb=15.3:15.1:9.3:59.8:0.4 (wt %).

Coating 1.5 mol % of $H_3BO_3$ was weighed as a surface treatment dopant and mixed using a mixer (manual mixer, MM).

The mixture was maintained under an $O_2$ or air (50 L/min) atmosphere in a box furnace, heated at 4.4° C./minute, and maintained at a sintering temperature of 300° C. for 7 to 12 hours, followed by furnace cooling to prepare a cathode active material.

<Example 2> Preparation of Cathode Active Material

A cathode active material was prepared in the same manner as in Example 1, except that 0.5 mol % of $NH_4HPO_4$ was mixed as a surface treatment dopant in the coating step of Example 1 and the calcination temperature in the coating step was 600° C.

The composition of the cathode active material prepared in Example 2 was Li:Ni:Co:Mn:Nb=15.0:14.8:9.3:60.0:0.8 (wt %).

<Comparative Example 1> Preparation of Cathode Active Material

A cathode active material was prepared in the same manner as in Example 1, except that a flux dopant was not mixed and a coating step was not performed.

<Comparative Example 2> Preparation of Cathode Active Material

A cathode active material was prepared in the same manner as in Example 1, except that the coating step of Example 1 was not performed.

<Comparative Example 3> Preparation of Cathode Active Material

A cathode active material was prepared in the same manner as in Example 1, except that a flux dopant was not mixed in Example 1.

<Production Example> Production of Lithium Secondary Battery 90 wt % of each of the cathode active materials according to Examples and Comparative Examples, 5.5 wt % of carbon black, and 4.5 wt % of a PVDF binder were dispersed in 30 g of N-methyl-2 pyrrolidone (NMP) to prepare a cathode slurry. The cathode slurry was applied to a 15 μm-thick aluminum (Al) thin film, which is a cathode current collector, dried, and then roll-pressed to produce a cathode. The loading amount of the cathode was 5.5 mg/cm$^2$ and the electrode density was 2.3 g/cm$^3$.

For the cathode, metallic lithium was used as a counter electrode, and a mixture of 1M $LiPF_6$ and EC/DMC (1/1, v/v) was used as an electrolyte.

A separator formed of a porous polyethylene (PE) film was injected between the cathode and the anode to form a battery assembly, and the electrolyte was injected into the battery assembly to produce a lithium secondary battery (coin cell).

Experimental Example

As can be seen from FIG. 1, when comparing Comparative Example 2 with Examples 1 and 2, there was no change in the size or shape of the primary particles due to the B and P coatings. When comparing Comparative Example 1 with Comparative Example 3, it can be seen that there was no particle growth due to the amorphous glassy oxide coating layer.

Figure 2:
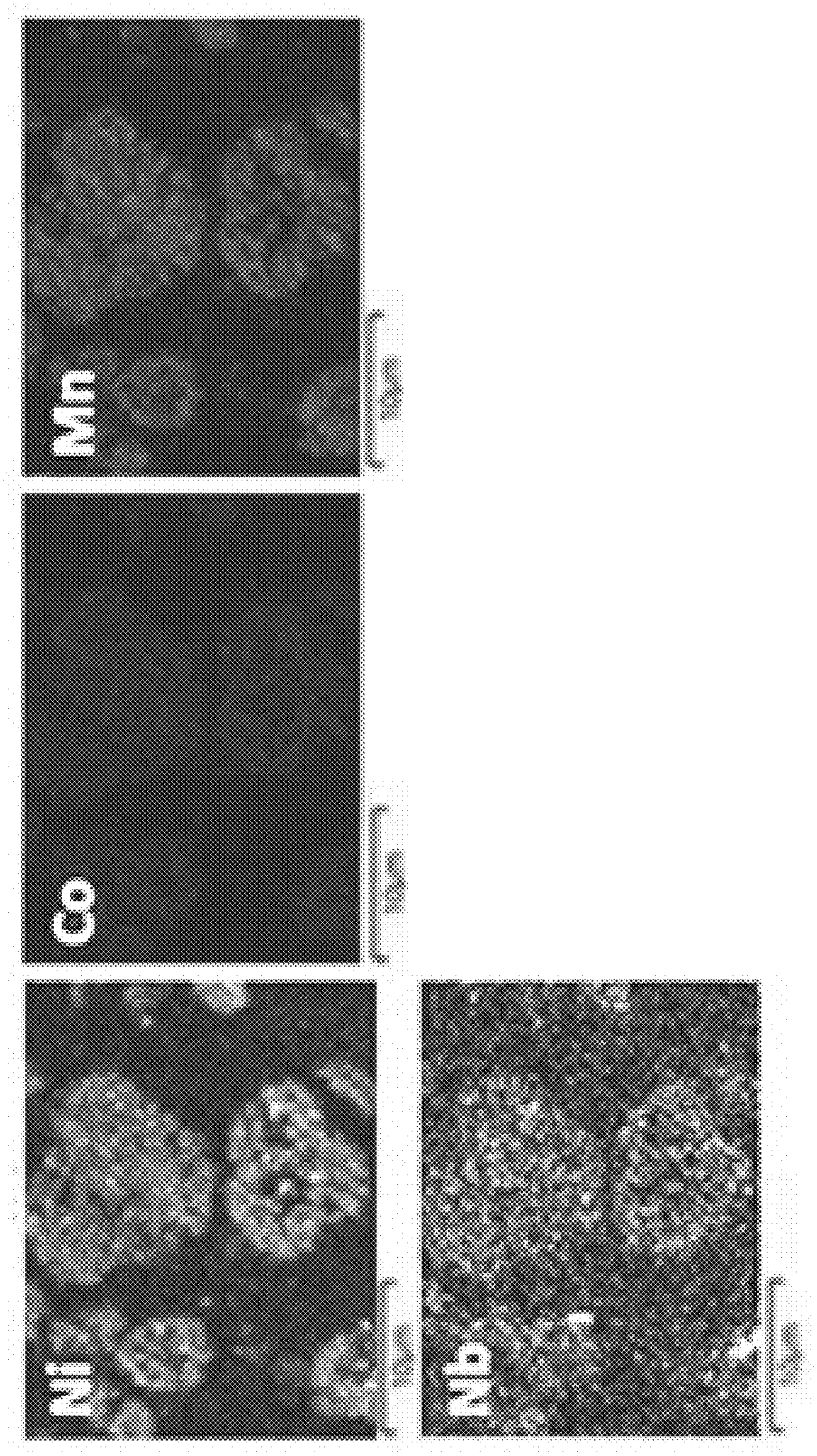
FIG. 2 shows the result of EDS performed on cathode active materials according to an embodiment of the present invention.

As can be seen from FIG. 2, not only Ni, Co, and Mn elements, but also Nb, which is a flux dopant inducing particle growth, are homogeneously distributed in the particles.

Figure 3:
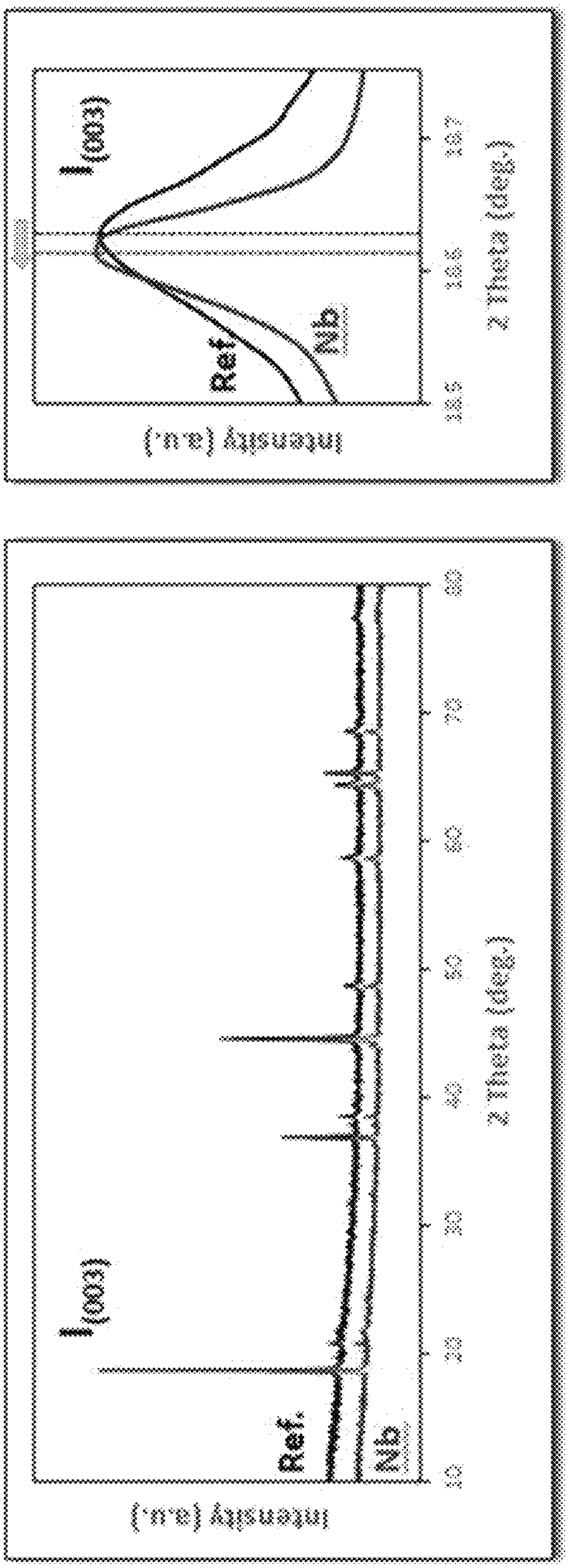
FIG. 3 shows the results of XRD analysis of cathode active materials according to Examples and Comparative Examples of the present invention.

The XRD analysis of FIG. 3 was performed at a wavelength of CuK α radiation=1.5406 Å. As can be seen from FIG. 3, when Nb is added as a flux dopant, the (003) peak shifts, which supports the notion that the overlithiated layered oxide lattice is doped with Nb, a flux dopant.

Figure 4:
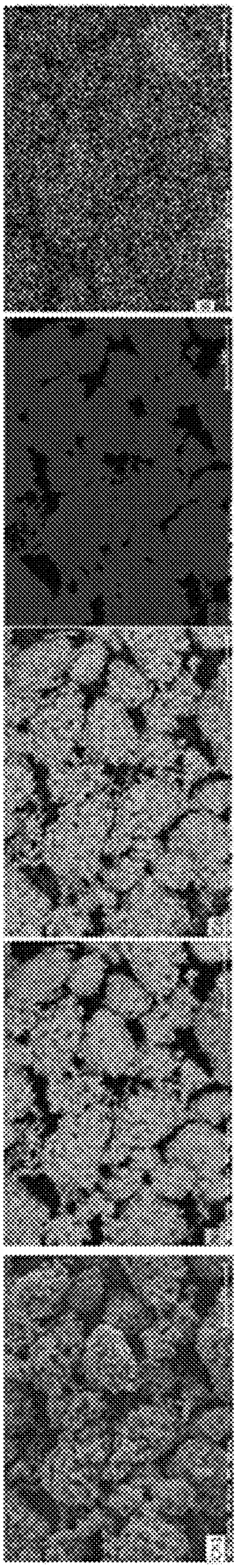
FIG. 4 shows the results of EDS performed on cathode active materials according to Examples of the present invention.

As can be seen from FIG. 4, the coating layer containing B is homogeneously distributed on the surface of the cathode active material according to Example 1.

Figure 5:
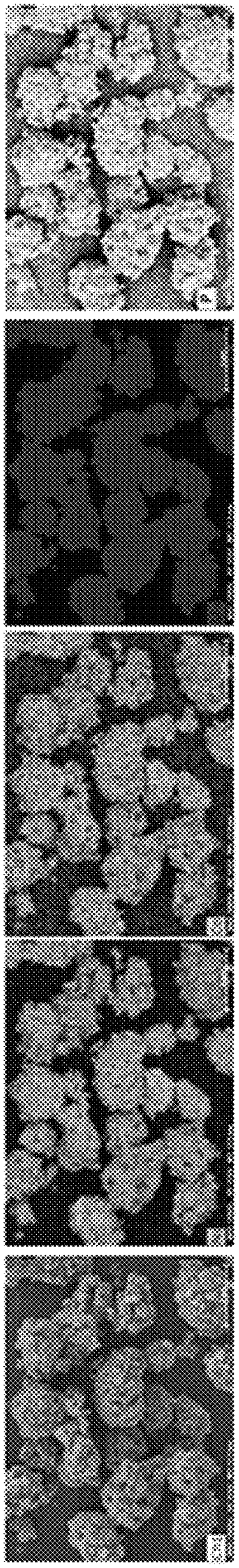
FIG. 5 shows the results of EDS performed on cathode active materials of Examples according to the present invention.

As can be seen from FIG. 5, the coating layer containing P is homogeneously distributed on the surface of the cathode active material according to Example 2.

Figure 6:
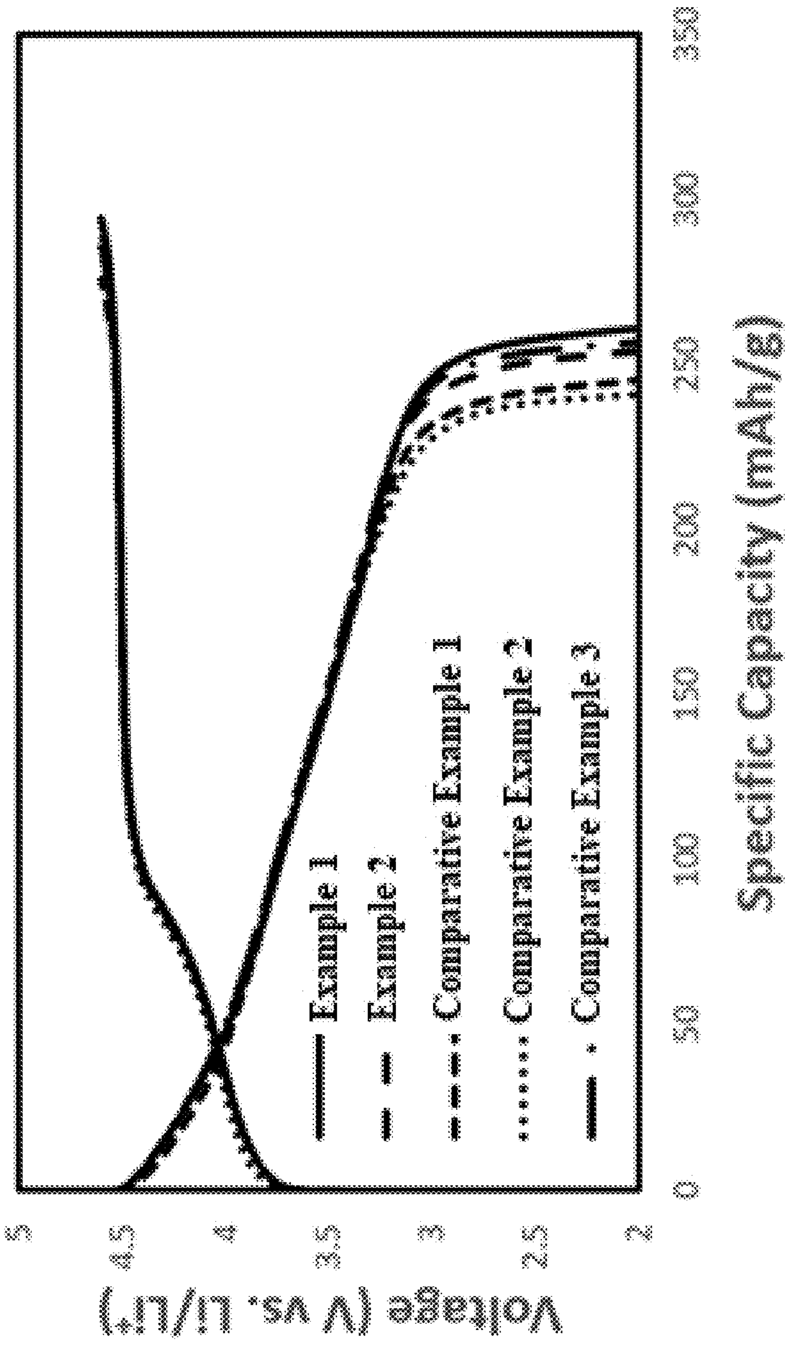
FIG. 6 is a charge/discharge graph of Examples and Comparative Examples of the present invention.

As can be seen from FIG. 6, compared to Comparative Example 1, in Comparative Example 2, the capacity decreased slightly as the primary particle size increased. This is because the kinetics decreases as the lithium ion diffusion distance increases. However, in Example, in which the amorphous glassy oxide coating layer is formed, the ion conductivity increases and the kinetics of the lithium ions increases, so the capacity increases.

Figure 7:
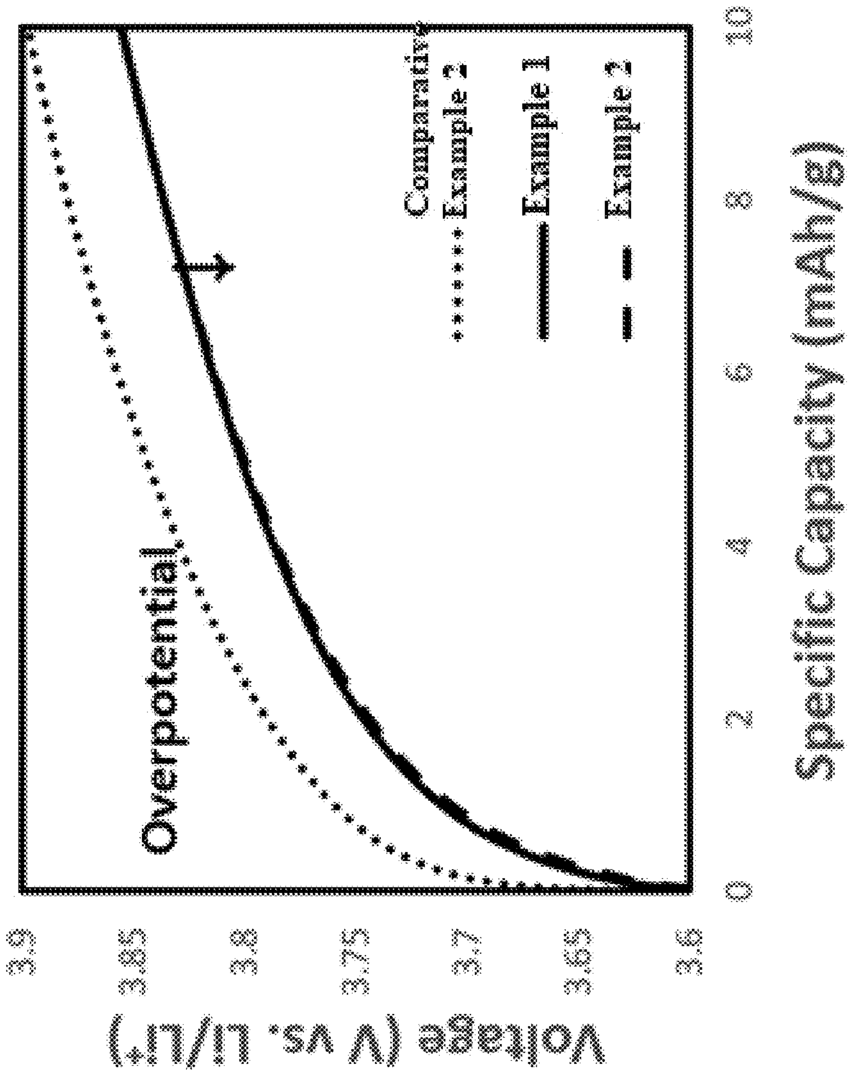
FIG. 7 is an overvoltage curve of Examples and Comparative Examples of the present invention.

As can be seen from FIG. 7, as the particle size increases, the diffusion distance of lithium ions increases, which causes a problem in which overpotential is generated due to concentration polarization of lithium ions. However, in Examples, in which the amorphous glassy oxide coating layer is formed, the overvoltage can be reduced due to the increased kinetics of lithium ions.

Figure 8:
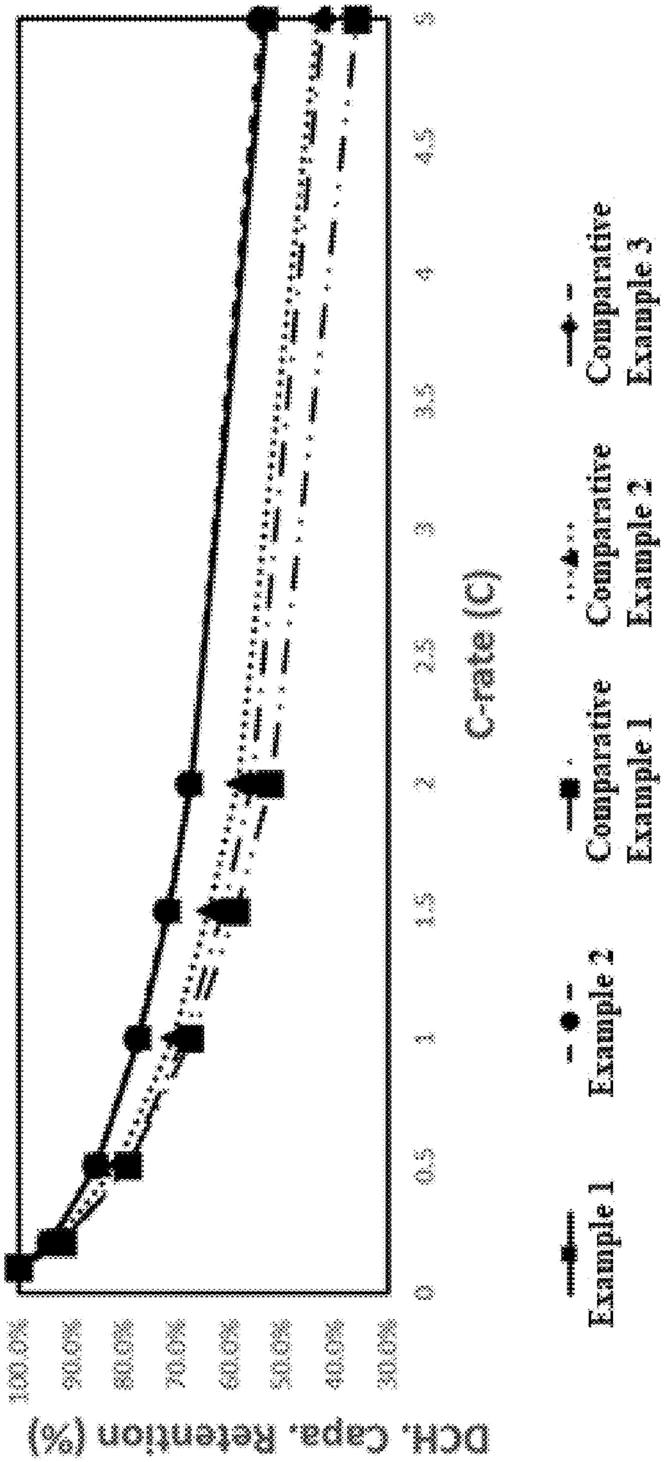
FIG. 8 is a rate characteristic curve according to Examples and Comparative Examples of the present invention.

As can be seen from FIG. 8, the rate characteristics of Examples are improved by about 10% or more compared to Comparative Examples. This is because the resistance is reduced due to the amorphous glassy oxide coating layer.

Figure 9:
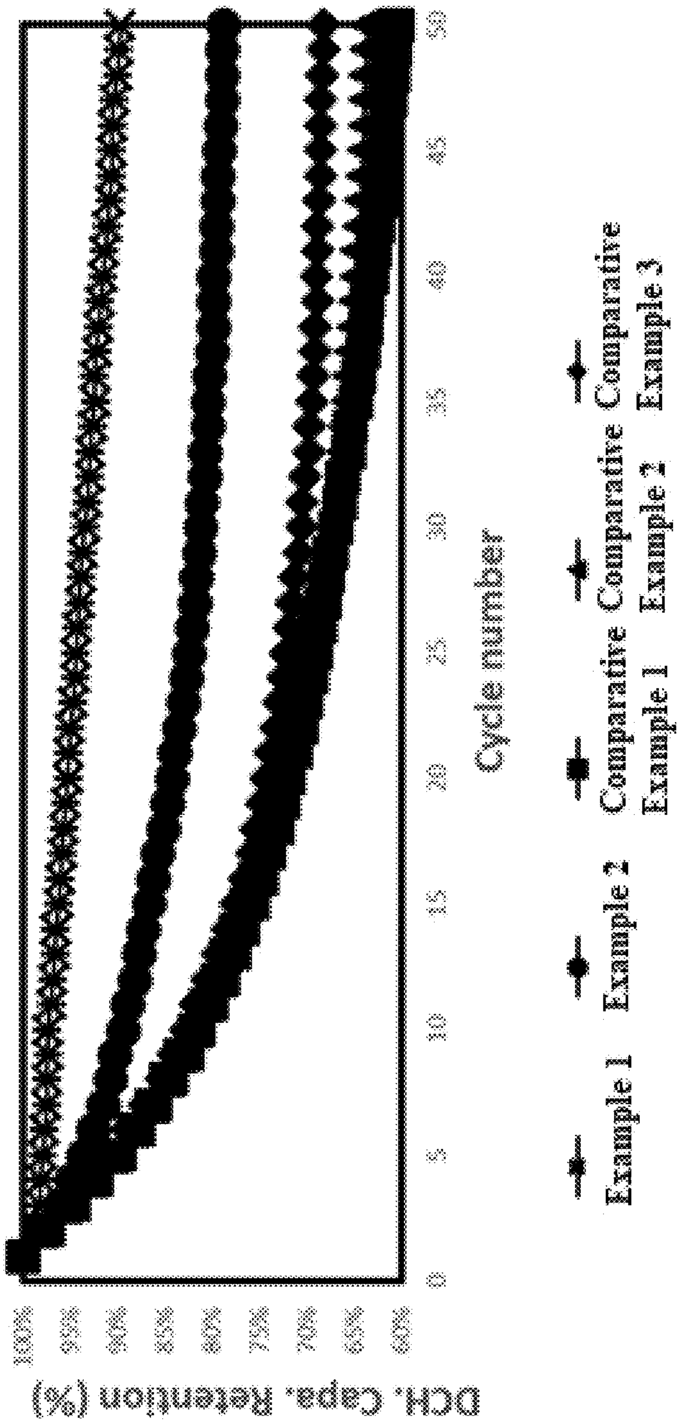
FIG. 9 shows the life characteristics according to Examples and Comparative Examples of the present invention.

As can be seen from FIG. 9, the lifetime characteristics of Comparative Example 3, in which the amorphous glassy oxide coating layer is formed, are improved by about 10% or more compared to Comparative Example 1. In addition, Examples 1 and 2, in which the particles are grown and the amorphous glassy oxide coating layer is formed, exhibit a capacity retention rate of 80% or more during cycling. This is because resistance is reduced by the amorphous glassy oxide coating layer, Mn elution is suppressed, the phase change from the spinel phase to the rock salt phase starting from the surface during cycling is suppressed, and the lifetime is improved.

Figure 10:
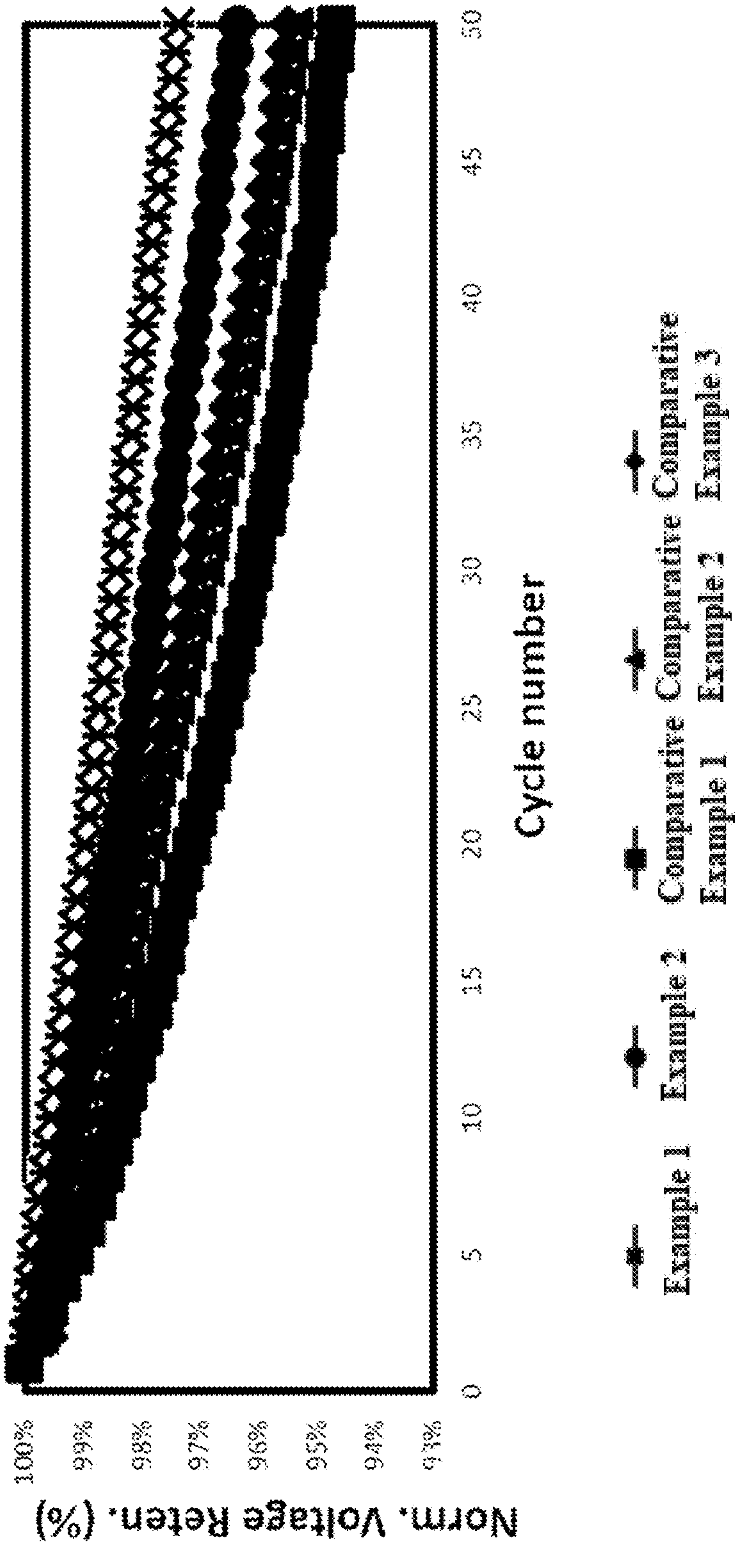
FIG. 10 shows the voltage retention ratio according to Examples and Comparative Examples of the present invention.

As can be seen from FIG. 10, Examples exhibited a voltage retention rate of 97%. This is because the phase change of the overlithiated layered oxide, occurring during cycling, was suppressed due to the amorphous glassy oxide coating layer.

The experimental results are shown in Table 1 below.

TABLE 1

| ITEM | | | Example 1 | Example 2 | Comparative Example 1 | Comparative Example 2 | Comparative Example 3 |
|---|---|---|---|---|---|---|---|
| Initial stage (@25° C.) 0.1 C 2.0-4.6 V | CH. | mAh/g | 294 | 286 | 276 | 286 | 291 |
| | DCH. | | 261 | 254 | 245 | 241 | 257 |
| | Eff. | % | 89 | 89 | 89 | 84 | 88 |
| High rate 5 C/0.1 C | Rate | | 53 | 54 | 36 | 43 | 42 |
| Lifetime (@25° C.) 1 C/1 C 2.0-4.6 V | Cycle Life (50cycle) | | 90 | 79 | 60 | 64 | 68 |
| | Voltage Decay (50cycle) | | 97.4 | 96.3 | 95 | 95 | 96 |

The invention claimed is:

1. A cathode active material for a lithium secondary battery comprising:

an overlithiated layered oxide (OLO) represented by Formula 1 below;

an amorphous glassy oxide coating layer formed on a surface of the overlithiated layered oxide represented by Formula 1, $$rLi_2MnO_3\cdot(1-r)Li_aNi_xCo_yMn_zM1_{1-(x+y+z)}O_2 \quad \text{[Formula 1]}$$

wherein r, a, x, y, and z satisfy $0<r\leq 0.6$, $0<a\leq 1$, $0\leq x\leq 1$, $0\leq y<1$, $0\leq z<1$, and $0<x+y+z\leq 1$, and M1 comprises at least one selected from Ba, Sr, P, Y, Zr, Nb, Mo, Ta, and W; and a material represented by the following Formula 3, $$Li_{a'}M3O_{b'} \quad \text{[Formula 3]}$$

wherein a' and b' satisfy $0<a'\leq 8$ and $0<b'\leq 15$, and M3 includes at least one selected from Ba, Sr, P, Y, Zr, Nb, Mo, Ta, and W, wherein primary particles of the overlithiated layered oxide aggregate to form secondary particles, wherein primary particles of the overlithiated layered oxide having a size of greater than 500 nm and less than or equal to 10 μm are present in an amount of 50 to 100 vol % based on a total amount of the primary particles constituting the secondary particles, and wherein the amorphous glassy oxide coating layer comprises at least one selected from Si, B, P, and Ge.

2. The cathode active material according to claim 1, wherein the amorphous glassy oxide coating layer comprises a material represented by Formula 2 below:

$$xLi_2O*(1-x)M2_aO_b \quad \text{[Formula 2]}$$

wherein x, a, and b satisfy $0<x\leq 8$, $0<a\leq 2$, and $0<b\leq 5$, and M2 comprises at least one selected from Si, B, P, and Ge.

3. The cathode active material according to claim 1, wherein the amorphous glassy oxide coating layer is present in an amount of 0.05 to 5 mol % based on an amount of the overlithiated layered oxide.

4. The cathode active material according to claim 1, wherein the amorphous glassy oxide coating layer has a thickness of 1 to 100 nm.

5. The cathode active material according to claim 1, wherein M1 in Formula 1 acts as a flux for growing the primary particles.

6. The cathode active material according to claim 1, wherein M1 in Formula 1 is present in an amount of 0.001 to 10 mol % based on a total number of moles of metals of the overlithiated layered oxide.

7. The cathode active material according to claim 1, wherein a ratio (Li/Ni+Co+Mn) of a number of moles of lithium to a total number of moles of all metals contained among Ni, Co, or Mn in the overlithiated layered oxide represented by Formula 1 is 1.1 to 1.6.

8. The cathode active material according to claim 1, wherein a ratio (Mn/Ni) of a number of moles of Mn to a total number of moles of Ni in the overlithiated layered oxide represented by Formula 1 is 1 to 4.5.

9. A secondary battery comprising the cathode active material according to claim 1.

10. A method of preparing the cathode active material for a secondary battery according to claim 1, the method comprising:

a first step of preparing a cathode active material precursor;

a second step of mixing the cathode active material precursor with a lithium compound and calcining the resulting mixture to form a lithium composite oxide; and a third step of mixing the material formed in the second step with a coating precursor to form an amorphous glassy oxide coating layer.

11. The method according to claim 10, wherein, in the second step, a compound containing M1 of Formula 1 is further mixed and calcined.

12. The method according to claim 10, wherein the third step further comprises, after mixing the material formed in the second step with the coating precursor, allowing the mixture to stand at 250 to 700° C. for 7 to 12 hours and then subjecting the mixture to furnace cooling.

13. The method according to claim 12, wherein the coating precursor comprises at least one selected from $B_2O_3$, $P_2O_5$, $H_3BO_3$, $NH_4HPO_4$, $NH_4H_2PO_4$, $(NH_4)_2HPO_4$, and $H_3PO_4$.

14. The method according to claim 10, further comprising, after the first step and before the second step, roasting the prepared precursor at 300 to 600° C.

15. The method according to claim 10, further comprising, after the first step and before the second step, washing the calcined material with water.

16. The method according to claim 10, further comprising, after the second step and before the third step, washing the calcined material with water.

* * * * *